(12) United States Patent
Fiedler et al.

(10) Patent No.: US 7,309,455 B2
(45) Date of Patent: Dec. 18, 2007

(54) PHOSPHOR COMPOSITION FOR LAMPS

(75) Inventors: Tim Fiedler, Munich (DE); Gunter Huber, Schrobenhausen (DE); Ulrich Muller, Munich (DE); Martin Zachau, Geltendorf (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 367 days.

(21) Appl. No.: 11/199,270

(22) Filed: Aug. 9, 2005

(65) Prior Publication Data

US 2006/0038162 A1    Feb. 23, 2006

(30) Foreign Application Priority Data

Aug. 20, 2004   (DE)   ............ 10 2004 040 686

(51) Int. Cl.
    *C09K 11/81*   (2006.01)
(52) U.S. Cl. .................... 252/301.4 P; 252/301.4 F
(58) Field of Classification Search ......... 252/301.4 P, 252/301.4 F
    See application file for complete search history.

(56) References Cited

U.S. PATENT DOCUMENTS 6,590,333 B1*   7/2003   Suzuki et al. ............... 313/495

OTHER PUBLICATIONS

Effect of Thorium on $Ce^{+3}$ Phosphors Mary V. Hoffman Lighting Research Laboratory, General Electric Company, Ohio 44112 vol. 118, No. 9 J. Electrochem. Soc.: Solid State Science Sep. 1971 pp. 1508-1510.

* cited by examiner

*Primary Examiner*—C. Melissa Koslow
(74) *Attorney, Agent, or Firm*—Robert F. Clark

(57) ABSTRACT

The invention relates to a phosphor composition for lamps with a lattice of monoclinic crystal structure (monazite) of type $(1-g)[((1-c-a)*Ln, c*Ce, a*A)PO_4] \times g*GeO_2$, in which Ln is at least one element selected from the group consisting of lanthanum La, gadolinium Gd and/or Yttrium Y and A is at least one activator selected from the group consisting of terbium Tb, praseodymium Pr and/or europium Eu, and $0 \leq a \leq 1.0$; $0 \leq c \leq 1.0$, and $0 < g \leq 0.2$.

17 Claims, 5 Drawing Sheets

PHOSPHOR COMPOSITION FOR LAMPS

TECHNICAL FIELD

The invention is based on a phosphor composition for lamps with a lattice of monoclinic crystal structure (monazite) of the $LnPO_4$:Ce, A type, in which Ln is at least one element selected from the group consisting of lanthanum La, gadolinium Gd and/or yttrium Y, and A is at least one activator selected from the group consisting of terbium Tb, praseodymium Pr and/or europium Eu.

PRIOR ART

The phosphor $LaPO_4$:Ce, Tb, as a very efficient green component, is in widespread use in three-band fluorescent lamps. To obtain both the activator ion Tb and the coactivator ion cerium Ce in the trivalent state, the phosphor is usually produced by annealing a suitable precursor or a suitable batch mixture in a slightly reducing shielding gas atmosphere. The phosphor obtained in this way is inherently very stable in air up to a temperature of more than approximately 200° C., i.e. it does not reveal any significant drop in the luminescence intensity if the temperature rises within this temperature range. However, if a heat treatment in air is carried out at significantly higher temperatures of greater than approx. 400° C., as is inevitable, for example, in the production of fluorescent lamps where the phosphor layers are heated, the phosphor $LaPO_4$:Ce, Tb undergoes not only a drop in its original quantum efficiency, but also at the same time acquires what are known as temperature quenching properties, i.e. the luminescence intensity decreases reversibly in the event of temperature rises, even well below approx. 200° C.

The damage to $LaPO_4$:Ce, Tb caused by heating to greater than 400° C. in air is explained by partial oxidation of the coactivator Ce from the trivalent state to the tetravalent state. This oxidation is only possible with the assistance of anion vacancies in the host lattice (M. V. Hoffmann: J. Electrochem. Soc. 118, 1508 (1971)). It is therefore known that thermal damage in air can be reduced by forming as perfect a crystal lattice as possible, with few vacancies, which it is aimed to achieve by using an optimized procedure, and/or by reducing the coactivator concentration. However, one drawback of the latter measure is that a reduction in the Ce content is associated with a drop in the capacity to absorb the exciting UV radiation, which means that the Ce content cannot be reduced to any desired level. Furthermore, it is known that anion vacancies are blocked by partial substitution of trivalent Ce ions by tetravalent thorium ions, allowing the oxidation of Ce to be prevented. However, a solution of this type is ruled out in practice on account of the radioactivity of natural thorium.

DISCLOSURE OF THE INVENTION

The object of the present invention is to alleviate the drawbacks which have been outlined above.

This object is achieved by at least partially substituting the Ce ions by germanium Ge ions, resulting in a phosphor composition with a lattice of monoclinic crystal structure (monazite) of the type $(1-g)[((1-c-a)*Ln,c*Ce,a*A)PO_4] \times g*GeO_2$. In this context, Ln is at least one element selected from the group consisting of La, Gd and/or Y, and A is at least one activator selected from the group consisting of Tb, Pr and/or Eu. The values for a, c and g are in the ranges $0 \leq a < 1.0$, $0 \leq c \leq 1.0$ and $0 < g \leq 0.2$.

The use of thorium as a stabilizing tetravalent doping element is based on the fact that the partial substitution of $Ce^{3+}$ by $Th^{4+}$ is particularly expedient, on account of their similar ion radii (107 and 102 nm respectively). However, since in practice the use of thorium is ruled out on account of its radio-activity, substitution with other large-diameter tetravalent ions has already been attempted (e.g. hafnium (78 pm) or zirconium (79 pm)). However, a stabilizing action for the phosphor $LaPO_4$:Ce, Tb was not found in any of these cases.

Surprisingly, recent tests have shown that partial substitution of $Ce^{3+}$ by the very much smaller tetravalent $Ge^{4+}$ (53 pm) causes a similar stabilizing action to the large tetravalent $Th^{4+}$. Even low levels of doping with Ge, based on the sum of the rare earth ions, can both increase the quantum efficiency of the phosphor and significantly improve the thermal stability.

In the case of a phosphor composition which emits radiation in the green wavelength region, of the type

i.e. type $(1-g)[((1-c-a)*Ln,c*Ce,a*A)PO_4] \times g*GeO_2$, with terbium Tb as activator A, the factors a, c and g should advantageously take the following values, in order to achieve as high a quantum efficiency as possible and to improve the thermal stability as much as possible:

$0.05 \leq a \leq 0.9$, preferably $0.1 \leq a \leq 0.5$, in particular $0.1 \leq a \leq 0.25$ $0.05 \leq c \leq 0.9$, preferably $0.1 \leq c \leq 0.5$, and $0 < g \leq 0.1$ preferably $0 < g \leq 0.05$.

Furthermore, it has been found that by partially substituting the Ce by Ge ions, it is possible to achieve an improvement not only to phosphor compositions which emit light in the visible radiation region, but also to phosphor compositions which radiate in the UV region.

In this context, an UV phosphor composition of the type $(1-g)[((1-c)*Ln,c*Ce)PO_4] \times g*GeO_2$, i.e. of the type $(1-g)[((1-c-a)*Ln,c*Ce,a*A)PO_4] \times g*GeO_2$ without activator A, i.e. a=0, advantageously has the following values for the factors c and g:

$0.01 \leq c \leq 1.0$, preferably $0.01 \leq c \leq 0.5$, in particular $0.01 \leq c \leq 0.1$;

$0 < g \leq 0.1$, preferably $0 < g \leq 0.05$.

In a UV phosphor composition, according to the invention, without Ce of the type

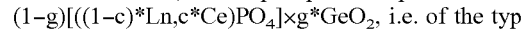

$(1-g)[((1-a)*Ln,a*Pr)PO_4] \times g*GeO_2$, i.e. of the type $(1-g)[((1-c-a)*Ln,c*Ce,a*A)PO_4] \times g*GeO_2$ with c=0 and praseodymium Pr as activator A, a and g should adopt the following values:

$0.001 \leq a \leq 0.1$, preferably $0.003 \leq a \leq 0.03$;

$0 \leq g \leq 0.1$, preferably $0 < g \leq 0.05$.

The concentration values given for the Ge doping, i.e. the factors g, are to be understood as meaning the concentrations which are calculated from the amount of the corresponding germanium compounds, e.g. germanium dioxide $GeO_2$, weighed into the batch mixture. In this context, it should be noted that the proportion of Ge ions which are actually incorporated in the, for example, lanthanum phosphate lattice during the annealing is highly dependent on the preparation conditions. Under the production conditions listed below, for example, it was approx. 10%.

Furthermore, examinations of the crystallographic changes associated with the partial substitution of $Ce^+$ by $Ge^{4+}$, for example by recording corresponding X-ray diffraction diagrams, revealed that with the phosphor compositions according to the invention doped with Ge, the relative height of the X-ray diffraction peak of the phosphor composition at 2θ=31.29° amounts to less than 50% with respect to the main peak at 2θ=28.70°. By contrast, the peak of the undoped specimen at 2θ=31.29° has a height of greater than 65% of the main peak.

The invention is explained in more detail on the basis of the following figures and exemplary embodiments.

DESCRIPTION OF THE MEASUREMENT DIAGRAMS

Figure 1:
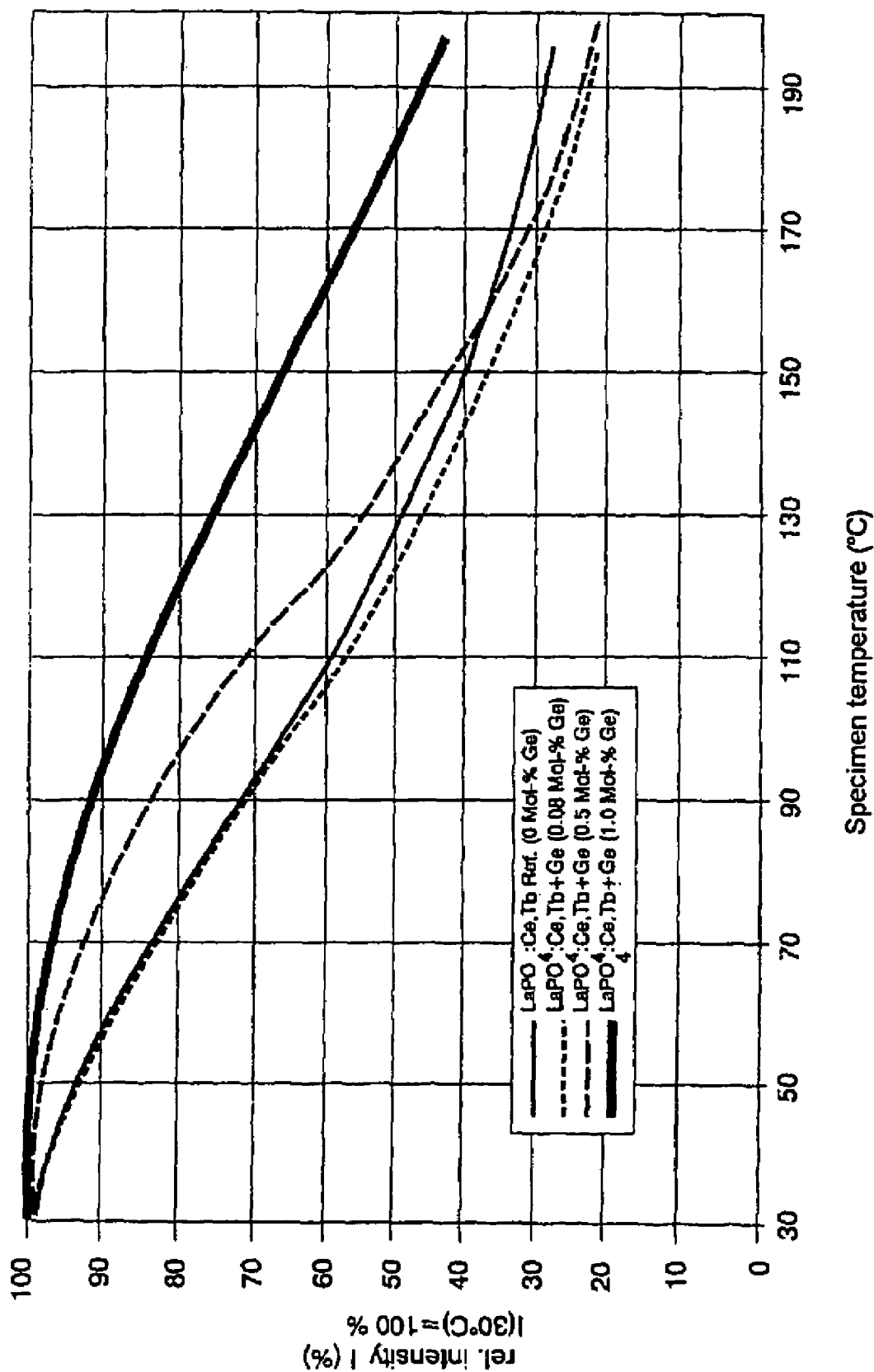
FIG. 1 shows the temperature quenching properties of $GeO_2$-doped $LaPO_4$:Ce, Tb phosphor compositions compared to an undoped reference specimen

FIG. 1 illustrates the temperature-quenching properties of $GeO_2$-doped $LaPO_4$:Ce, Tb phosphor compositions by comparison with an undoped reference specimen.

Even doping with 0.5 mol %, based on the sum of the rare earth ions in $LaPO_4$:Ce, Tb results in a significantly lower temperature-dependent drop in the luminosity compared to an undoped comparison phosphor following a heat treatment for 30 minutes at 600° C. in air. Whereas the undoped reference specimen, for example at a temperature of 90° C., has an intensity drop of more than 30% compared to the starting value at room temperature, the drop at this temperature for the specimen doped with 0.5 mol % of Ge is only 20%, and in the case of a specimen doped with 1.0 mol %, this drop is only 10% of the initial brightness.

Figure 2:
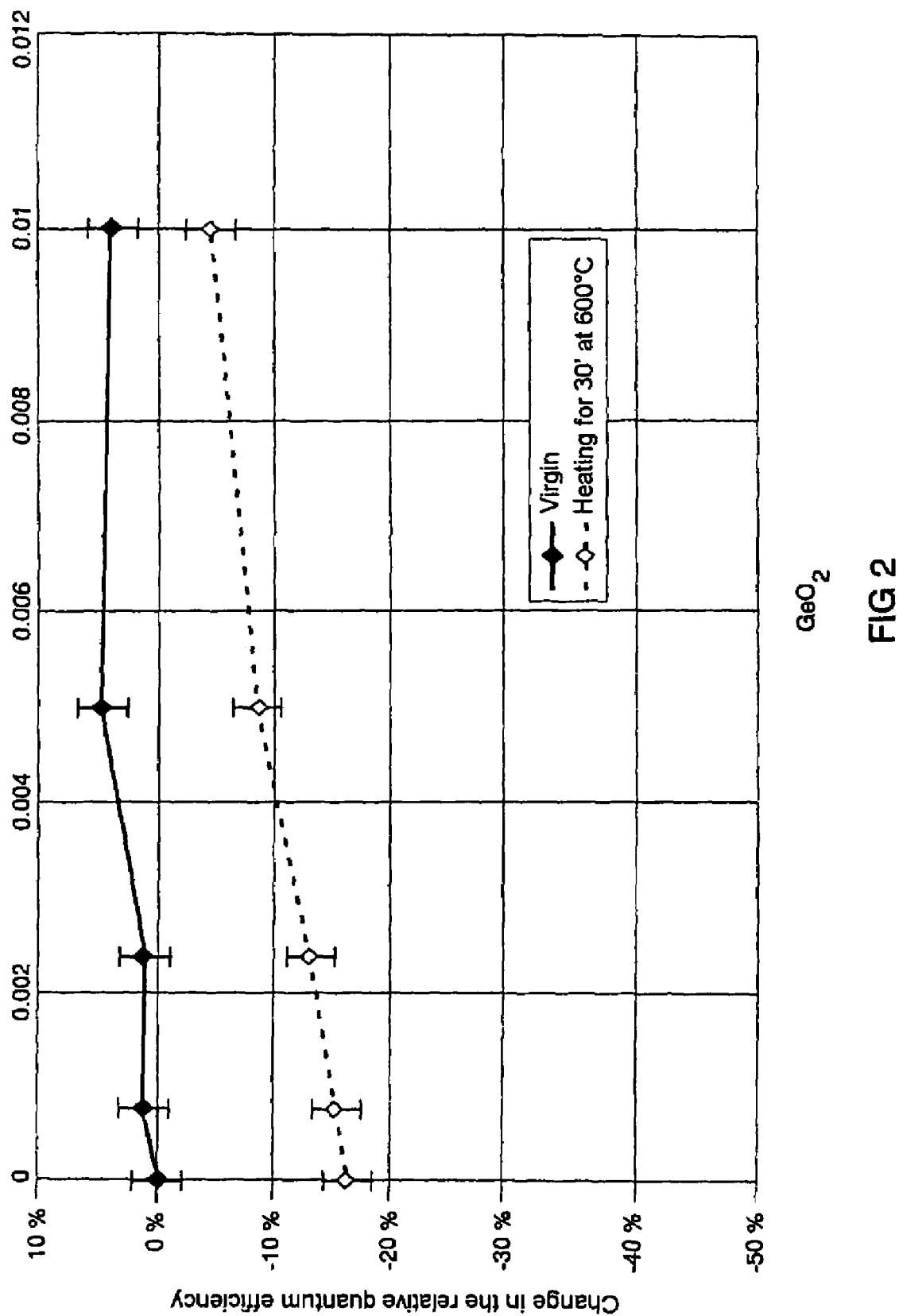
FIG. 2 shows the change in the relative quantum efficiency of an $LaPO_4$:Ce, Tb phosphor composition with a Ge content increasing from 0 to 1 mol %, based on the sum of the rare earth ions in the phosphor composition

FIG. 2 illustrates the change in the relative quantum efficiency of an $LaPO_4$:Ce, Tb phosphor composition with the Ge content increasing from 0 to 1 mol %, based on the sum of the rare earth ions in the phosphor composition.

With increasing amounts of germanium of from 0.08 mol % to 1.0 mol %, the quantum efficiency rises by approx. 5%. Even after a heat treatment for 30 minutes at 600° C. in air, the partial substitution stabilizes the quantum efficiency: whereas the oxidation damage which occurs during this process reduces the quantum efficiency of the undoped phosphor by approximately 15%, the drop in the quantum efficiency of the Ge-doped specimens, compared to the virgin phosphor prior to the heat treatment, is only 14% when using 0.08 mol % of Ge and just 5% when using 1.0 mol % of Ge.

Figure 3:
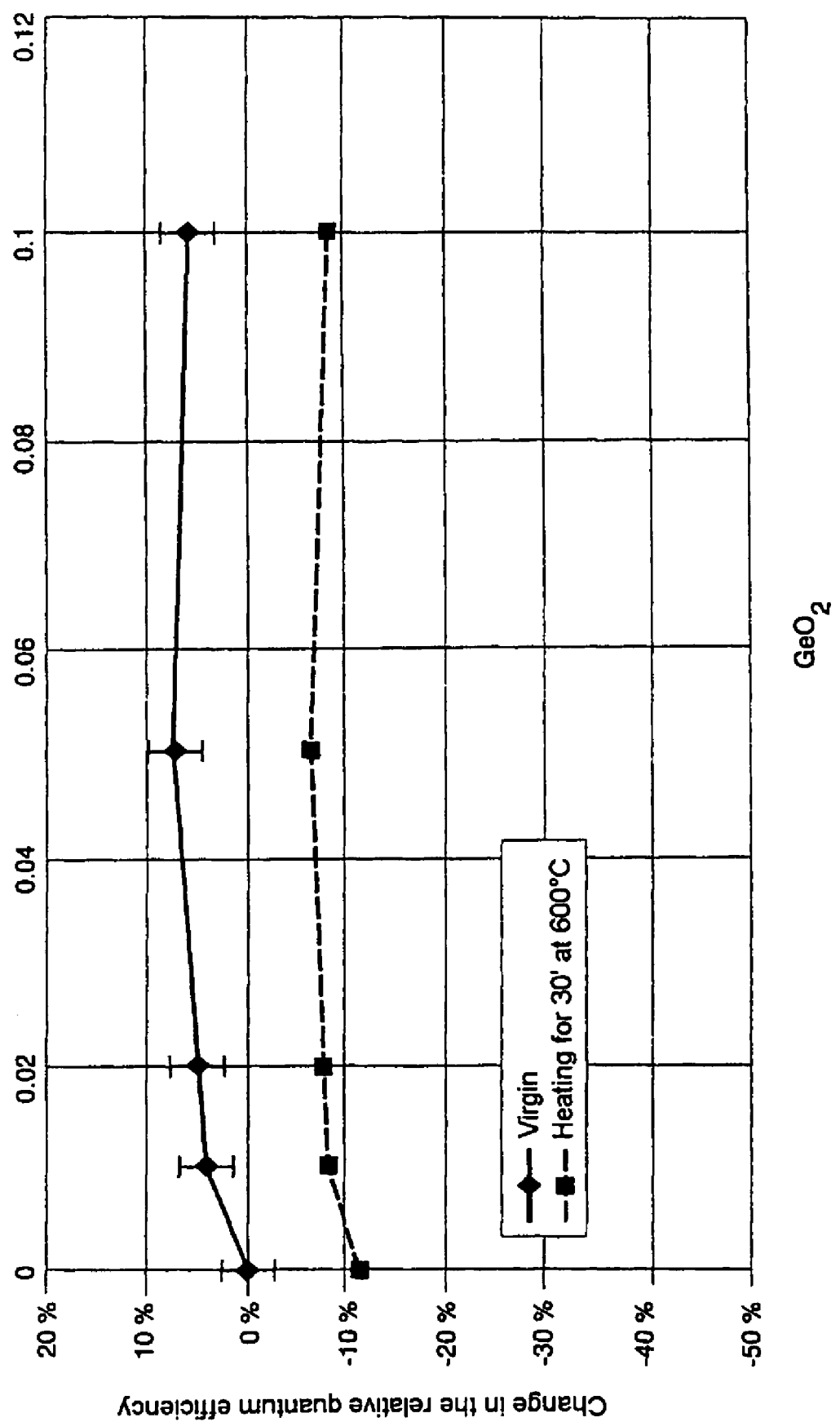
FIG. 3 shows the change in the relative quantum efficiency of an $LaPO_4$:Ce, Tb phosphor composition with a Ge content increasing from 0 to 10 mol %, based on the sum of the rare earth ions in the phosphor composition

FIG. 3 shows the change in the relative quantum efficiency of an $LaPO_4$:Ce, Tb phosphor composition with a Ge content increasing from 0 to 10 mol %, based on the sum of the rare earth ions in the phosphor composition.

If the concentration for the partial substitution is increased to up to 10 mol % of Ge, the virgin phosphor has a flat maximum for the increase in quantum efficiency at approx. 5 mol % of Ge, whereas the heat-treated phosphors (heat treatment for 30 minutes at 600° C.) reach a saturation in the quantum efficiency at just approximately 1 mol %.

Figure 4A:
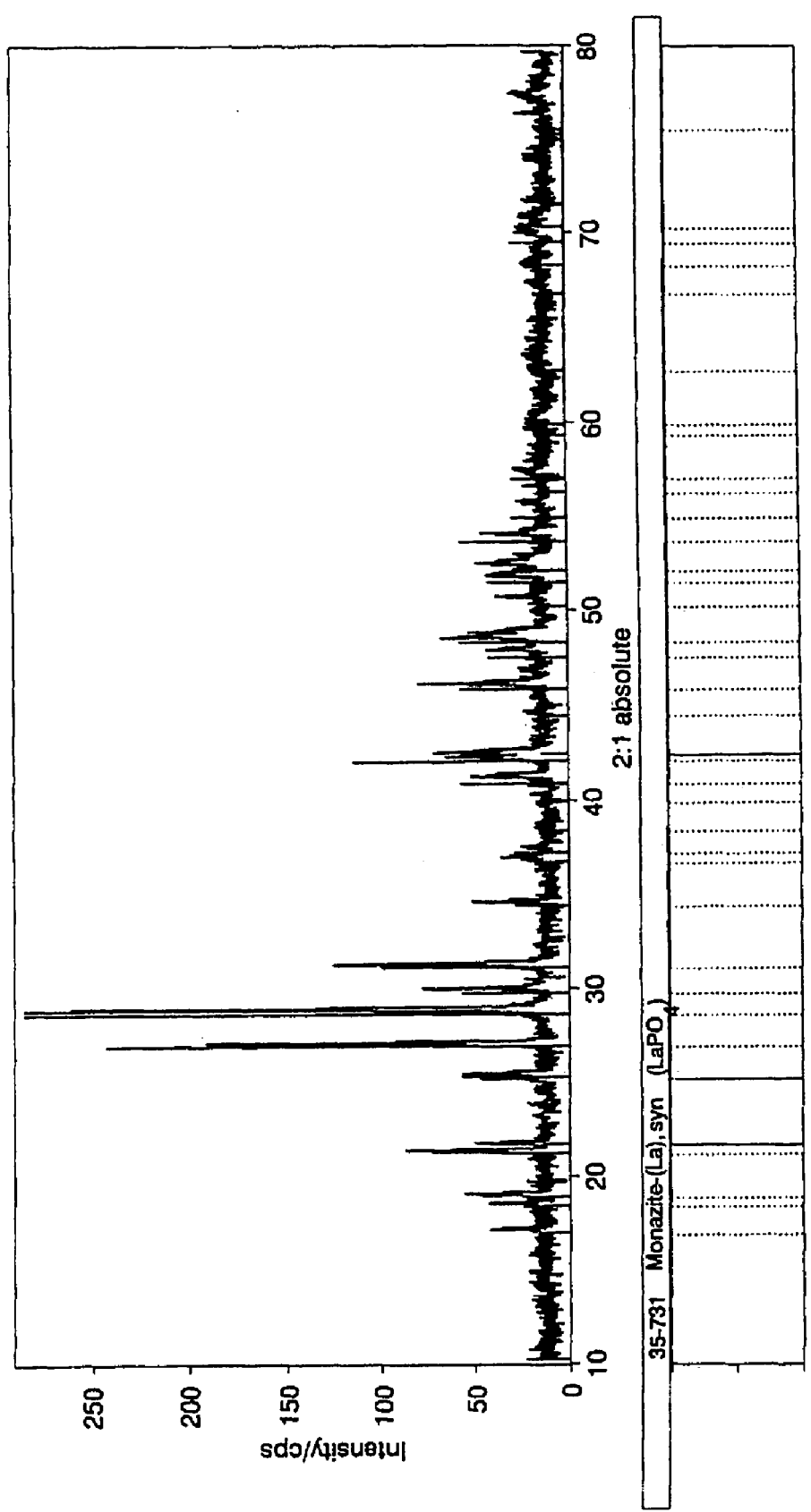
FIG. 4a shows the X-ray diffraction diagram for an $LaPO_4$:Ce, Tb phosphor composition according to the invention with a Ge addition of 0.05 mol % based on the sum of the rare earth ions in the phosphor composition.
Figure 4B:
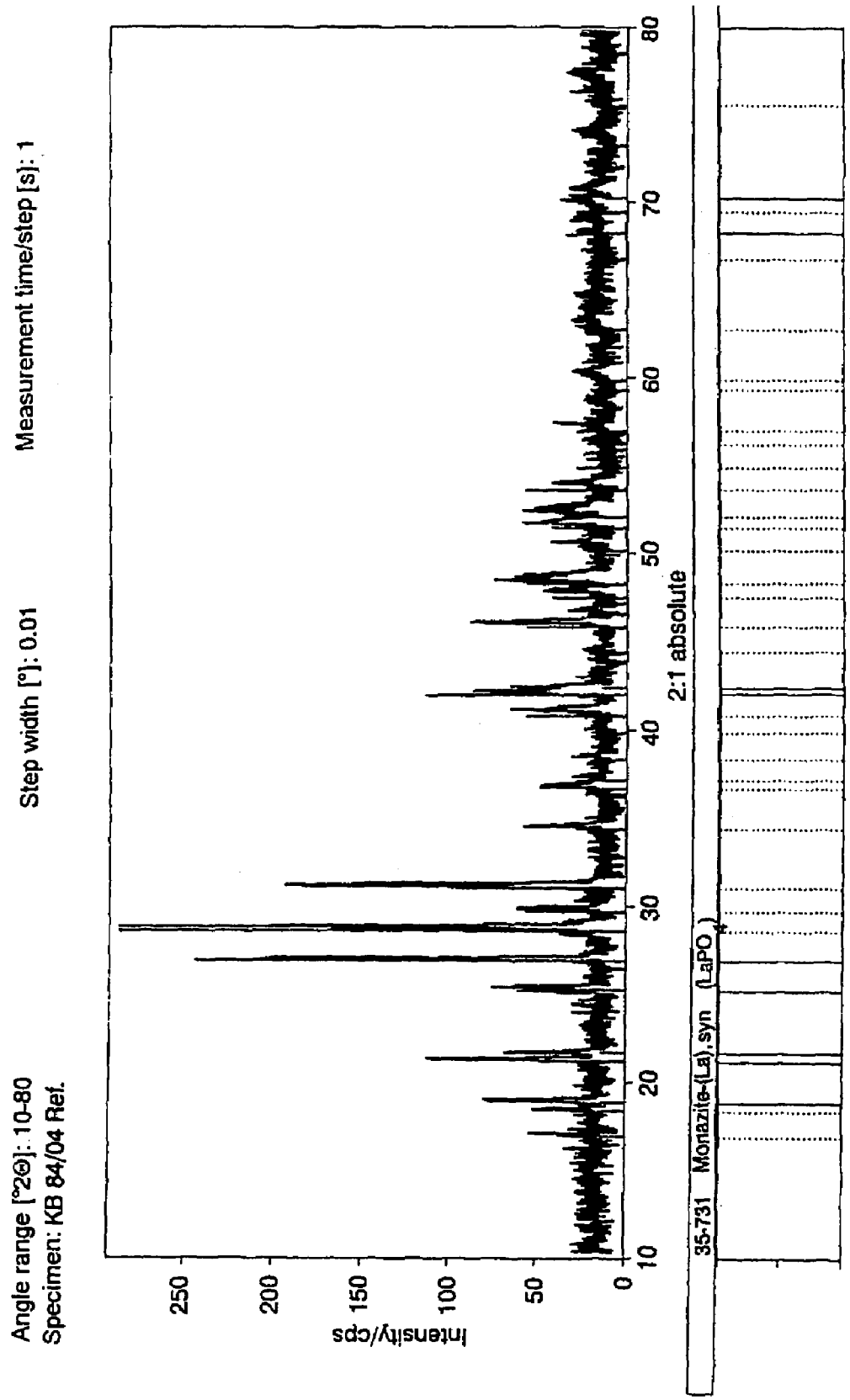
FIG. 4b shows the X-ray diffraction diagram for an $LaPO_4$:Ce, Tb phosphor composition according to the invention without the addition of Ge.

FIGS. 4a and b show the X-ray diffraction diagram for an $LaPO_4$:Ce, Tb phosphor composition according to the invention, with 0.05 mol % of Ge added, based on the sum of the rare earth ions in the phosphor composition and without the addition of Ge, respectively.

If the crystallographic changes which are associated with the partial substitution of $Ce^{3+}$ by $Ge^{4+}$ are examined, for example by recording corresponding X-ray diffraction diagrams, it will be clear that the relative heights (based on the main reflection at 2θ=28.70°) of the X-ray peaks at an angle of 2θ=31.29°, at 44% to 51%, are significantly lower in the case of phosphor compositions doped with Ge than in the case of undoped $LaPO_4$:Ce, Tb where the relative height is 67%.

The quantum efficiency increases by up to 5% with increasing proportions from 0 to 1 mol % of Ge (based on the sum of the rare earth ions). After heating for 30 minutes at 600° C., during which an undoped $LaPO_4$:Ce, Tb specimen suffers a drop in quantum efficiency of 16%, the reduction in the QE of doped specimens falls to just 5%, with increasing proportions of Ge up to 1 mol %.

EXAMPLES OF THE PREPARATION OF THE PHOSPHOR COMPOSITIONS

Preparation of a first exemplary embodiment of a phosphor composition according to the invention:

a quantity of 40 g of an $LaPO_4$:Ce, Tb mixed oxide of the composition: $La_{0.444}Ce_{0.418}Tb_{0.138}PO_4$ is carefully homogenized with a quantity of 179 mg of $GeO_2$, together with the addition of a small quantity of a few tenths of a percent of a suitable melting aid (e.g. boric acid or alkali metal fluoride), in a mortar mill. After the mixture has been introduced into an aluminum oxide crucible, an anneal (2 hours at 1200° C.) is carried out in a reducing atmosphere. After cooling, the phosphor is removed from the crucible, finely milled in the mortar mill and then screened. The result is a Ge-doped phosphor of composition $La_{0.444}Ce_{0.417}Tb_{0.138}PO_4 \times 0.01 GeO_2$.

Preparation of a phosphor composition which is not in accordance with the invention, as comparison:

a quantity of 40 g of an $LaPO_4$:Ce, Tb mixed oxide of composition: $La_{0.444}Ce_{0.418}Tb_{0.138}PO_4$, without the additional $GeO_2$ is carefully homogenized, together with a small quantity of a few tenths of a percent of a suitable melting aid (e.g. boric acid or alkali metal fluoride) in a mortar mill. After the mixture has been introduced into an aluminum oxide crucible, an anneal (2 hours at 1200° C.) is carried out in a reducing atmosphere. After cooling, the phosphor is removed from the crucible, finely milled in the mortar mill and then screened. The result is an undoped phosphor of composition $La_{0.444}Ce_{0.418}Tb_{0.138}PO_4$.

Preparation of a further exemplary embodiment of a phosphor composition according to the invention:

A further phosphor according to the invention is prepared in the same way as in Exemplary Embodiment 1, except that following the final screening the phosphor is washed in a dilute monoethanolamine solution (wash with 1.5 ml of monoethanolamine (MEA) in 1 liter of deionized water for 2 hours at room temperature, decant supernatant solution, wash again with deionized water, filter and dry).

The phosphor composition according to the invention in accordance with Exemplary Embodiment 1 has a quantum efficiency which is 4% higher than the phosphor which is not doped with $GeO_2$. After a heat treatment for 30 minutes at 600° C., the quantum efficiency of this phosphor is only 5% below that of the reference phosphor prior to heat treatment and therefore more than 10% above that of the reference phosphor which had been heat-treated in the same way. At an operating temperature of 90° C., the heat-treated phosphor according to the invention in accordance with Exemplary Embodiment 1 still has a QE value, based on its quantum efficiency at room temperature, of more than 90%, whereas the undoped reference phosphor suffered a quantum efficiency loss of approximately 30% at this temperature.

The phosphor composition according to the invention from Exemplary Embodiment 2 has the same advantages over the reference phosphor composition as the phosphor composition according to the invention in accordance with Exemplary Embodiment 1, but also has an initial quantum efficiency which is 2% higher than the latter.

The person skilled in the art will understand that the invention is independent of minor changes in the phosphor stoichiometry. The positive influence of the addition of germanium is retained even in the event of variations in the preparation process, such as, for example, a double anneal or the use of other melting aids. All these variations accordingly form part of the present invention.

What is claimed is:

1. A phosphor composition for lamps with a lattice of monoclinic crystal structure (monazite) of type

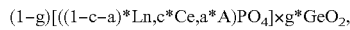

in which Ln is at least one element selected from the group consisting of lanthanum La, gadolinium Gd and yttrium Y and A is at least one activator selected from the group consisting of terbium Tb, praseodymium Pr and europium Eu, and $0 \leq a \leq 1.0$ $0 \leq c \leq 1.0$, and $0 < g \leq 0.2$.

2. The phosphor composition as claimed in claim 1, in which the activator A is terbium Tb, and
$0.05 \leq a \leq 0.9$
$0.05 \leq c \leq 0.9$, and
$0 < g \leq 0.1$.

3. The phosphor composition as claimed in claim 1, in which,
a=0
$0.01 \leq c \leq 1.0$,
and $0 < g \leq 0.1$.

4. The phosphor composition as claimed in claim 1, in which the activator A is praseodymium Pr and
c=0
$0.001 \leq a \leq 0.1$, and
$0 < g \leq 0.1$.

5. The phosphor composition as claimed in claim 1, in which the relative height of the X-ray diffraction peak of the phosphor composition at $2\theta=31.29°$ amounts to less than 50% with respect to the main peak at $2\theta=28.70°$.

6. The phosphor composition as claimed in claim 2, in which the relative height of the X-ray diffraction peak of the phosphor composition at $2\theta=31.29°$ amounts to less than 50% with respect to the main peak at $2\theta=28.70°$.

7. The phosphor composition as claimed in claim 3, in which the relative height of the X-ray diffraction peak of the phosphor composition at $2\theta=31.29°$ amounts to less than 50% with respect to the main peak at $2\theta=28.70°$.

8. The phosphor composition as claimed in claim 4, in which the relative height of the X-ray diffraction peak of the phosphor composition at $2\theta=31.29°$ amounts to less than 50% with respect to the main peak at $2\theta=28.70°$.

9. The phosphor composition as claimed in claim 2, in which $0.1 \leq a \leq 0.5$.

10. The phosphor composition as claimed in claim 2, in which $0.1 \leq a \leq 0.25$.

11. The phosphor composition as claimed in claim 2, in which $0.1 \leq c \leq 0.5$.

12. The phosphor composition as claimed in claim 2, in which $0 < g \leq 0.05$.

13. The phosphor composition as claimed in claim 3, in which $0.01 \leq c \leq 0.5$.

14. The phosphor composition as claimed in claim 3, in which $0.01 \leq c \leq 0.1$.

15. The phosphor composition as claimed in claim 3, in which $0 < g \leq 0.05$.

16. The phosphor composition as claimed in claim 4, in which $0.003 \leq a \leq 0.03$.

17. The phosphor composition as claimed in claim 4, in which $0 < g \leq 0.05$.

* * * * *